(12) United States Patent
Semnani et al.

(10) Patent No.: US 11,796,740 B2
(45) Date of Patent: Oct. 24, 2023

(54) OPTICAL DEVICE

(71) Applicant: Chiral Quantum Inc., Waterloo (CA)

(72) Inventors: Behrooz Semnani, Kitchener (CA); Rubayet Al Maruf, Waterloo (CA); Michal Bajcsy, Waterloo (CA)

(73) Assignee: Chiral Quantum Inc., Waterloo (CA)

( * ) Notice: Subject to any disclaimer, the term of this patent is extended or adjusted under 35 U.S.C. 154(b) by 0 days.

(21) Appl. No.: 17/874,490

(22) Filed: Jul. 27, 2022

(65) Prior Publication Data

US 2023/0033722 A1 Feb. 2, 2023

Related U.S. Application Data

(60) Provisional application No. 63/227,370, filed on Jul. 30, 2021.

(51) Int. Cl.
*G02B 6/32* (2006.01)
*G02B 6/27* (2006.01)
*G02B 6/26* (2006.01)

(52) U.S. Cl.
CPC .............. *G02B 6/325* (2013.01); *G02B 6/262* (2013.01); *G02B 6/2726* (2013.01)

(58) Field of Classification Search
None
See application file for complete search history.

(56) References Cited

U.S. PATENT DOCUMENTS

| 4,818,661 | A   | * | 4/1989  | Taylor    | G03F 1/20     |
|-----------|-----|---|---------|-----------|---------------|
|           |     |   |         |           | 205/135       |
| 6,942,925 | B1  | * | 9/2005  | Lazarev   | G02B 5/3033   |
|           |     |   |         |           | 428/432       |
| 9,995,859 | B2  | * | 6/2018  | Kamali    | G02B 27/4211  |
| 9,995,930 | B2  | * | 6/2018  | Arbabi    | G02B 27/4272  |
| 10,199,415| B2  | * | 2/2019  | Akselrod  | G02F 1/1339   |
| 10,670,782| B2  | * | 6/2020  | Arbabi    | G02B 5/1876   |
| 2017/0082842 | A1 | * | 3/2017  | Shaltout  | H01S 5/1042  |
| 2018/0292644 | A1 | * | 10/2018 | Kamali    | G02B 26/0875 |
| 2019/0339543 | A1 | * | 11/2019 | Zhu       | G02C 7/049   |

(Continued)

OTHER PUBLICATIONS

Chase et al. 1550 nm high contrast grating VCSEL. Department of Electrical Engineering and Computer Sciences, University of California, Berkeley. 2010.

(Continued)

*Primary Examiner* — Rhonda S Peace
(74) *Attorney, Agent, or Firm* — Alexandre Daoust; Norton Rose Fulbright Canada LLP

(57) ABSTRACT

The optical device can comprise a substrate having a first face opposite a second face, a thickness between the first face and the second face, the first face and the second face being planar, the first face being parallel the second face, the substrate being transparent to an electromagnetic radiation in a given spectrum; a planar polarization-dichroic focusing lens covering the first face, the lens having a first focusing power for a first polarization of the electromagnetic radiation and a second focusing power for a second polarization of the electromagnetic radiation, the second focusing power being different from the first focusing power; and a planar polarization-dichroic mirror covering the second face, the mirror being reflective to the first polarization and transparent to the second polarization.

10 Claims, 3 Drawing Sheets

(56) References Cited

U.S. PATENT DOCUMENTS

| | | | |
|---|---|---|---|
| 2020/0067281 A1* | 2/2020 | Curwen | H01S 5/3401 |
| 2020/0264343 A1* | 8/2020 | Han | G02B 1/14 |
| 2023/0033722 A1* | 2/2023 | Semnani | G02B 5/3083 |
| 2023/0208104 A1* | 6/2023 | Tamagnone | G06N 3/08 372/20 |

OTHER PUBLICATIONS

Flannery et al. Fabry-Pérot Cavity Formed with Dielectric Metasurfaces in a Hollow-Core Fiber. Institute for Quantum Computing, Physics and Astronomy, and Electrical and Computer Engineering, University of Waterloo, Ontario, Canada. 2018.

Fattal et al. Flat dielectric grating reflectors with focusing abilities. Nature photonics. Published Online: May 2, 2010 | DOI: 10.1038/NPHOTON.2010.116.

Flannery et al. Polarization dichroic mirrors for quantum optics with atomic ensembles. Institute for Quantum Computing, University of Waterloo.

Semnani et al. Spin-preserving chiral photonic crystal mirror. Light: Science & Applications ( 2020)https://doi.org/10.1038/s41377-020-0256-5.

Li et al. Strong Optical Confinement between Nonperiodic Flat Dielectric Gratings. Physical Review Letters. 2011 American Physical Society.

Arbabi, A., Horie, Y., Bagheri, M. et al. Dielectric metasurfaces for complete control of phase and polarization with subwavelength spatial resolution and high transmission. Nature Nanotech 10, 937-943 (2015).

* cited by examiner

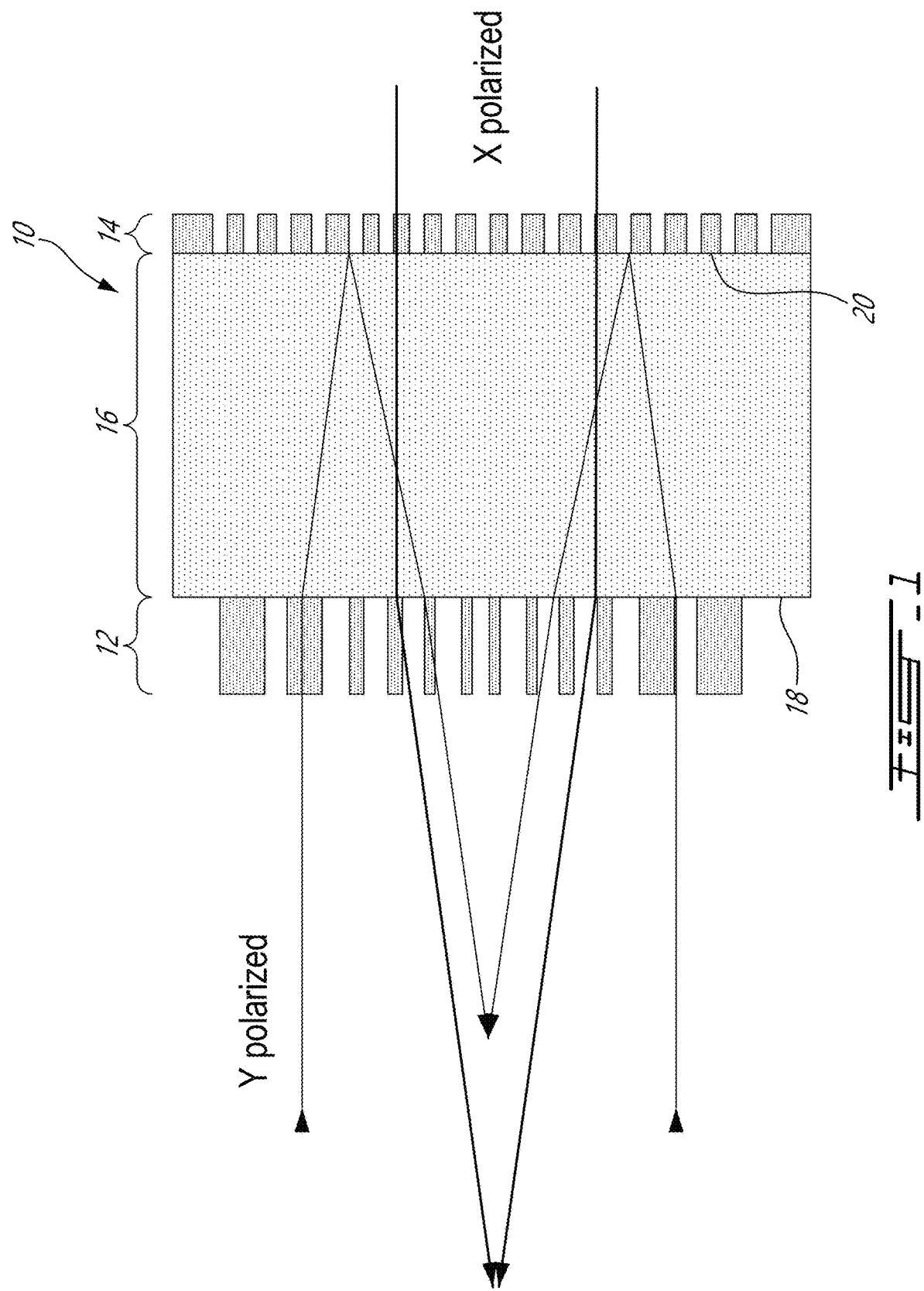

OPTICAL DEVICE

BACKGROUND

The field of optics and photonics has continuously evolved over the last decades and while many innovations have been developed, there is an ever increasing motivation to create components which either are smaller, more efficient, less costly and/or which allow new functionalities. There always remains room for improvement.

SUMMARY

In accordance with one aspect, there is provided an optical device comprising: a substrate having a first face opposite a second face, a thickness between the first face and the second face, the first face and the second face being planar, the first face being parallel the second face, the substrate being transparent to an electromagnetic radiation in a given spectrum; a planar polarization-dichroic focusing lens covering the first face, the lens having a first focusing power for a first polarization of the electromagnetic radiation and a second focusing power for a second polarization of the electromagnetic radiation, the second focusing power being different from the first focusing power; and a planar polarization-dichroic mirror covering the second face, the mirror being reflective to the first polarization and transparent to the second polarization. A Fabry-Pérot cavity can be formed using the optical device at one or both sides of the cavity. The optical device can be supported at the tip of an optical fiber, such as by being mounted/attached onto the tip, and in the case of a Fabry-Pérot cavity, the optical devices can be supported at the tip of two collinear optical fibers.

Many further features and combinations thereof concerning the present improvements will appear to those skilled in the art following a reading of the instant disclosure.

DESCRIPTION OF THE FIGURES

In the figures,

FIG. 1 is a schematic cross-sectional view of an example of an optical device in accordance with an embodiment;

DETAILED DESCRIPTION

Figure 2B:
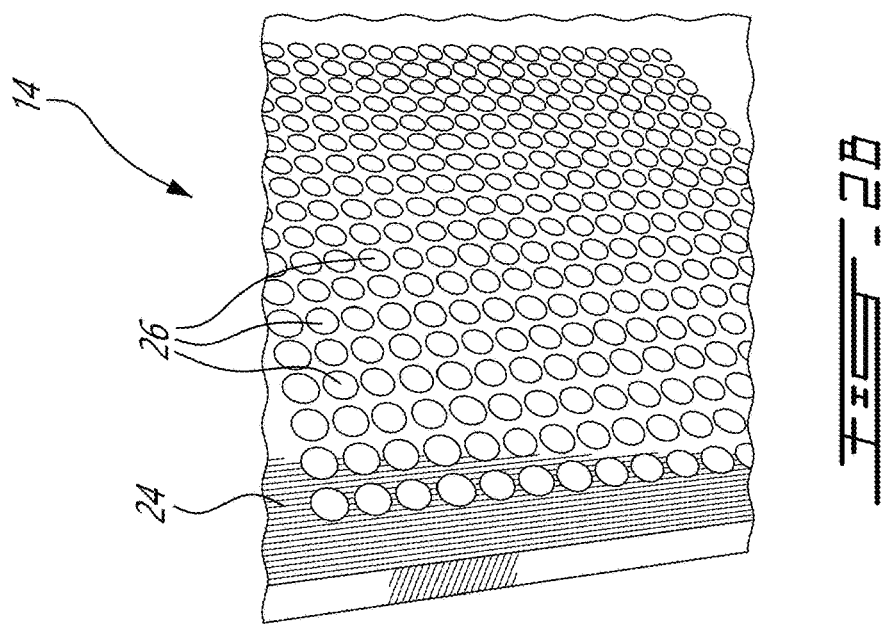
FIG. 2B is a close-up view of an example photonic crystal forming a polarization dichroic mirror in accordance with an embodiment.

FIG. 1 shows an example of an optical device 10. The optical device 10 includes a polarization-dichroic focusing lens 12 and a polarization-dichroic mirror 14 both embodied as planar nanostructure devices which are supported and held apart from one another by a transparent substrate 16 which can be made of a material such as glass. More specifically, if these planar nanostructure devices were applied directly onto one another, they could interfere with one another in this embodiment. The transparent substrate 16 can create a distance between the polarization-dichroic focusing lens 12 and the polarization-dichroic mirror 14 which effectively decouples one from the other from the photonics point of view.

Both nanostructure devices are planar and very thin in this embodiment, which can make them very suitable for miniaturization or implementation on an optical fiber tip, for instance. Correspondingly, the substrate 16 has two opposite faces 18, 20, which can arbitrarily be tagged first and second for ease of later reference, and which can both be planar. The first face 18 and second face 20 are also parallel to one another. Each of the polarization-dichroic focusing lens 12 and the polarization-dichroic mirror 14 can be relatively thin and be made to cover a corresponding one of the faces 18, 20 by deposition thereon, for instance. Both these components are designed to act differently on two different polarizations of electromagnetic radiation within a spectrum of interest (e.g. visible light, infrared light, a specific group of wavelengths, etc), and the substrate 16 can be selected to have excellent transmission (i.e. be very transparent) to electromagnetic radiation within the spectrum of interest.

The focusing lens 12 is polarization-dichroic in the sense that it is designed to impart different focusing strengths for different polarizations (say a first polarization and a second polarization) of the electromagnetic radiation. The mirror 14 is polarization-dichroic in the sense that it has significantly higher reflectivity to electromagnetic radiation in a first one of the polarizations than to the electromagnetic radiation which is in the second polarization. In the illustrated embodiment, the reflectivity can be close to 100% for the first polarization and be close to 0%, and thus perfect transparency, for the second polarization. The polarizations can be two orthogonal linear polarizations of light in one embodiment for instance, or two opposite circular polarizations in another embodiment, for instance.

In the embodiment presented in FIG. 1, the difference in focusing power perceived by the different polarizations of electromagnetic radiation is harnessed in a manner to produce a coinciding focus for a) a first polarization of light (say X polarized) transmitted across the optical device via the polarization-dichroic mirror 14 and then focussed by the polarization dichroic lens 12 at a first focusing power, and b) a second polarization of light (say Y polarized) focussed a first time as it is received through the focusing lens 12 and focussed a second time subsequently to having travelled back and forth across the substrate 16 and having been reflected by the polarization-dichroic mirror 14. The focus for the first polarization and the focus for the second polarization can be arranged such that the foci are either coinciding or spaced by a specific distance considered suitable to the context of a particular optical device 10. It will be understood that the difference in the optical paths can be affected both by the extent to which the perceived focusing power is different for the different polarizations and by the thickness of the glass substrate, which are controllable parameters. Accordingly, that the focal points corresponding to these two different optical paths can be made to coincide by making an appropriate selection of these two controllable parameters, or can be made to be spaced by a desired, engineered distance. The expression "coinciding focus" or "coinciding focal points" is used herein to refer to a scenario where the focus for the two polarizations can be close enough such that the mode areas of the two orthogonal polarization can match (e.g. be identical) at focus.

In one embodiment, both the focusing lens 12 and the mirror 14 can be composed of corresponding, planar dielectric structures with nano-scale patterns. The dielectric layers can be made of amorphous silicon, for instance, which has a refractive index of n≈3.4 over an operational spectrum having a wavelength range of 800 nm-900 nm.

Figure 2A:
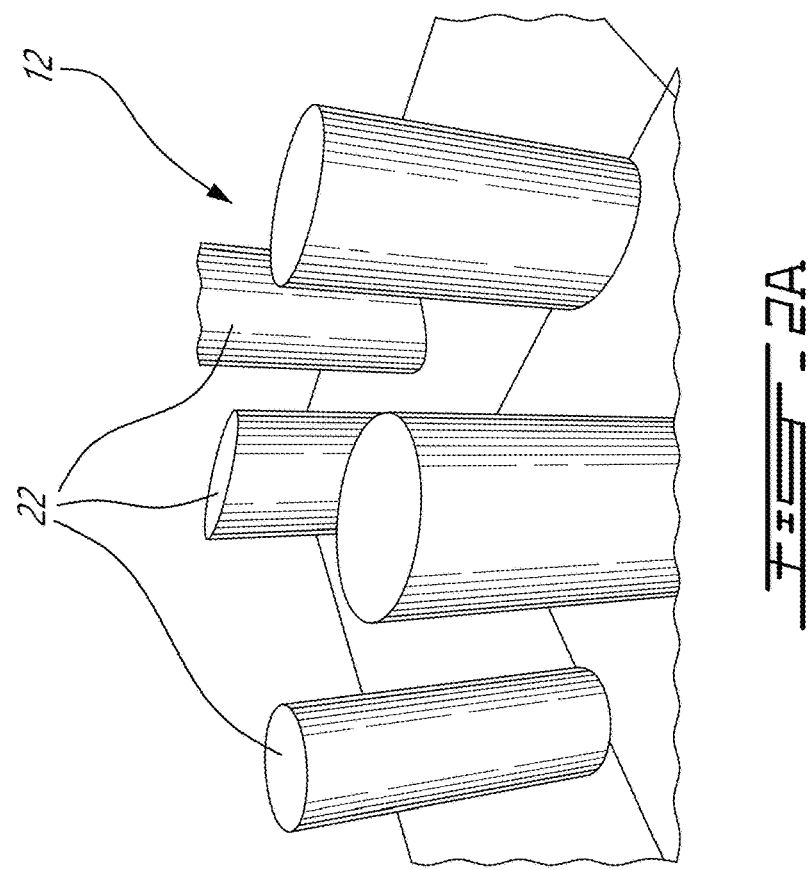
FIG. 2A is a close-up view of an example metasurface forming a polarization dichroic focusing lens in accordance with an embodiment.

As shown in FIG. 2A, the focusing lens 12 can be composed of high-aspect-ratio dielectric nano-rods 22 which can provide different phase shaping for orthogonal polarization states of light. More specifically, the focusing lens 12 can be a wavefront shaping dielectric metasurface composed of an array of high-aspect-ratio dielectric nanorods 22 whose dimensions are precisely designed to realize focusing properties for the orthogonal polarization states in lens/mirror modes respectively. The nanorods 22 can be elliptical in their cross section. In alternate embodiments, a 2-dimensional array having a similar function can be embodied with metallic structures instead of dielectric structures for instance. Indeed, nanostructures can be provided in the form of small pillars, small metallic particles, metallic shapes, etc. Pillars can be shaped with circular, oval, or even other cross-sectional shapes such as square and the height can vary as a function of the embodiment. Two-dimensional nanopillars, sometimes referred to as nanofins can also be used in alternate embodiment. The pillars can be perpendicular to the surface of the glass substrate onto which they are supported, which may be easier to produce with processes such as photolithography, but in alternate embodiments it may be preferred for the nanopillars to taper along their height or otherwise extend obliquely to a certain extent. The nanopillars can be discrete. Their function can be to do the focusing for two orthogonal orientations differently, such as by providing different focal points for different polarizations. This can be achieved by controlling the wavefront of the impinging electromagnetic radiation, such as locally adding a phase to the phase front. Flat polarization-dichroic lenses can be composed of an array of symmetry-broken dielectric nanopillars with subwavelength dimensions. The arrays could be either periodic or semi-periodic in which the intra-pilar spacings are gradually tailored. Several classes of the polarization-dichroic lenses can be envisioned. Nanopillars' shape and their arrangements (i.e., the unit cell) can be designed so that the lens provides different focusing properties for two orthogonal polarizations. For instance, if the lens is intended to focus the linear polarization states of light (i.e., x and y polarizations) differently, the dielectric nanopillars' dimensions across the x and y axes can be made different, which can be achieved with an elliptical cross-sectional shape for instance. The focusing property of such mirrors can rely on multiple physical mechanisms though which in turn leads to different types of flat polarization-dichroic lenses. Examples of such structures include (but are not limited to) Pancharatnam-Berry Phase Metasurfaces which are inherently dichroic, the metasurfaces composed of dielectric nanopillars with spatially varying dimensions and finally quasiperiodic gratings which offer spatially varying intra-pilar spacing with higher order diffraction terms. In alternate embodiment, the polarization-dichroic lens can be embodied as a Pancharatnam-Berry Phase Metasurface or a quasiperiodic grating for instance.

As shown in FIG. 2B, the mirror 14 can be implemented as a photonic crystal such as a thin dielectric slab 24 perforated by a periodic array of holes 26. Polarization-dichroic mirrors 14 can consist of symmetry-broken sub-wavelength nanostructures. For instance, if the mirror acts differently for the opposite circular polarization states of light, the nano structures can carry chiral symmetry. In alternate embodiments, the mirror can be implemented as a high contrast grating. If a polarization-dichroic photonic crystal mirror is selected, it can consist of a periodic array of through-holes on a subwavelength thick dielectric slab. The holes' shape and their arrangement can be designed to provide the desired reflectivity contrast for the two orthogonal polarizations of light. High-contrast gratings, on the other hand, can be composed of an array of high dielectric pillars or gratings which are properly shaped so the mirror behaves differently for the two orthogonal polarizations Indeed, polarization dichroic metasurfaces are two-dimensional structures capable of independently controlling the amplitude, phase and polarization of orthogonally polarized incident waves. They can effectively act similar to a lens with an aberration free performance. Additionally, different wave front shaping can be achieved for the different polarization states of light. Photonic crystals slabs, i.e. an optically thin dielectric slab with a periodic array of perforating holes, can be designed to act as polarization dichroic mirrors so that for only one polarization of light, they act as perfect mirrors whereas for the orthogonal polarization state, they are fully transparent.

A metasurface and a photonic crystal mirror can be combined such as presented in FIG. 1 to form an optical device which acts as a focusing mirror for one polarization of light and as a focusing lens for the opposite polarization. The metasurface can be appropriately designed so that the focal lengths for the mirror and lens match, such that the mode areas of the two orthogonal polarizations are identical at focus.

Optical devices 10 such as presented in FIG. 1 can be used in forming a Fabry-Pérot cavity. More specifically, optical devices such as presented above can be used in forming one, or both sides of a Fabry-Pérot cavity (if used only on one side, another type of arrangement can be used to form the other side). More specifically, a pair of the above-described optical devices 10, 10' can be employed to make a confocal polarization-dichroic Fabry-Pérot cavity 30 such as presented in FIGS. 3A and 3B.

In one embodiment, one or two optical devices 10, 10' can be mounted on tips of corresponding optical fibers, which would allow one to make a compact (miniaturized and monolithic), fibre-integrated version of such confocal polarization-dichroic Fabry-Pérot cavity 30.

Since the optical energy resides primarily in free space and therefore is readily accessible to objects such as atoms, molecules, etc., such a Fabry-Pérot cavity 30 can find potential applications in laser physics (e.g. gas laser), gas sensors, and other quantum technologies such as quantum optic logic gates. In one example, the optical device 10 can allow efficient injection of an optical pump into gain medium based on atomic or molecular gas located between the two sides of the Fabry-Pérot cavity 30, while simultaneously confining the orthogonal polarization state in the confocal cavity 30.

Figure 3B:
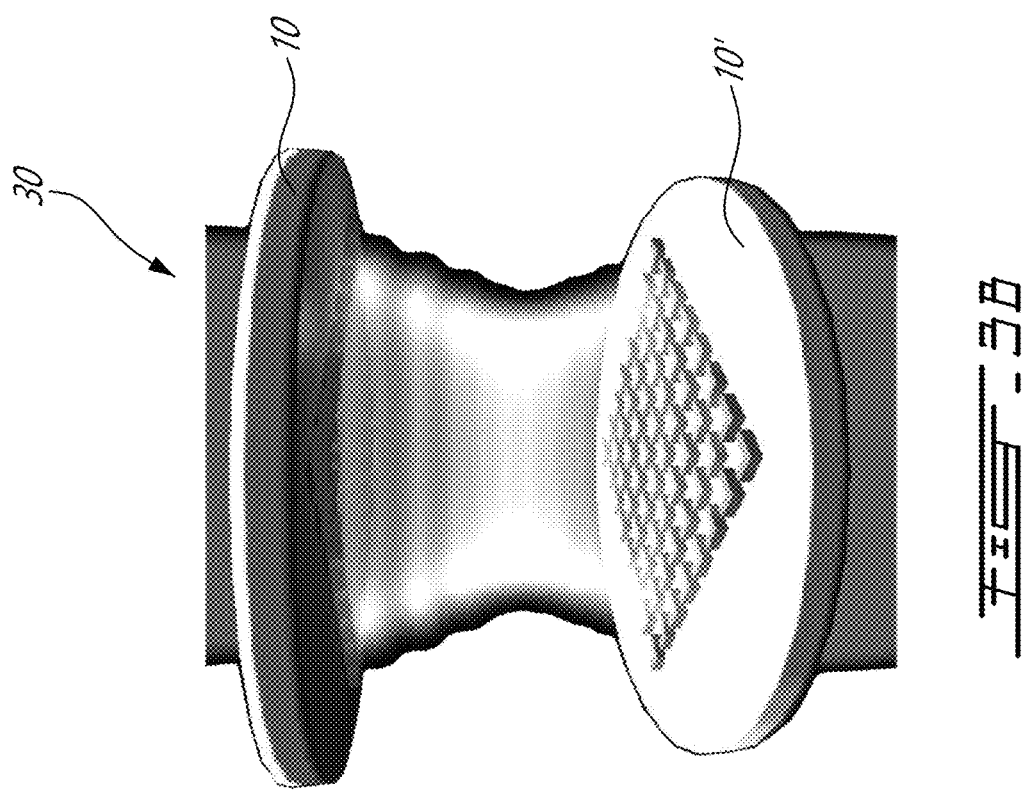
FIGS. 3A and 3B show optical paths of two polarizations, respectively, traveling in a Fabry-Pérot cavity made with optical devices such as the optical device of FIG. 1, in accordance with an embodiment.
Figure 3A:
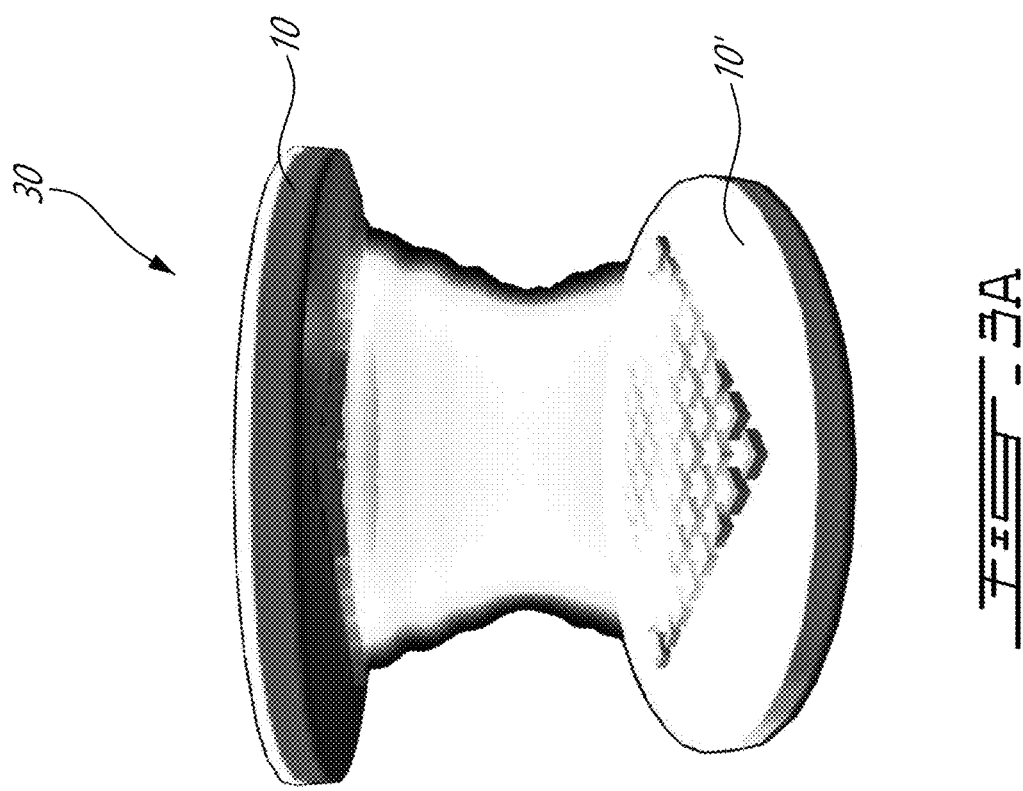

In the embodiment shown in FIGS. 3A and 3B, a pair of optical devices 10, 10' can be employed to make a polarization-dichroic Fabry-Pérot cavity 30. In one embodiment, the optical devices 10, 10' can be identical. The cavity 30 can be confocal. In the reflective state of polarization presented in FIG. 3A, a cavity mode is formed by appropriately spacing the optical devices 10, 10'. The optical devices 10, 10' can be designed so that the lens mode gets focused precisely at the focal distance of the other optical device. The cavity mode can be optimized through the optical device's dimensions to minimize the mode volume which in turn can lead to a higher interaction of light and matter and may improve the operation of a resultant laser. On a more fundamental level, a cavity formed by a pair of the proposed optical devices 10, 10' can be used to increase the interaction time between a single photon with a polarization for which the optical device 10 acts as a mirror (and the photon will be thus temporarily trapped in the cavity) and a polariton formed by another single photon (of polarization for which the optical device 10' acts as a lens) interacting with atomic or molecular gas placed between the optical devices 10, 10'. This increase in photon-polariton interaction time can be used to improve the performance of all-optical switches and all-optical transistors controlled with single-photon signals, as well as for non-destructive photon detection, to improve the efficiency of wavelength conversion at single photon levels, and for quantum sensing, to name a few examples.

Indeed, the optical devices can be potentially used to make polarization dichroic optical cavities. Such cavities can be particularly useful to make gas sensors and fiber integrated lasers. In gas lasers, using separate optical feed lines as the pump and the lased beams may render full integration inefficient. Furthermore, spatially separated pump and lased beams may not efficiently overlap and thus the performance may degrade. A fiber-fed polarization-dichroic cavity may provide a route towards more efficient lasing and integration.

In a practical embodiment, maximum reflectivity difference in transmission and reflection mode can be sought. To this end, for one polarization only, not only the reflectivity can be made close to 100%, the focusing efficiency can be made close to unity as well (i.e. virtually all the reflected light is focused). The second challenge involves designing a highly birefringent metasurface forming a polarization dichroic focussing lens so that the focal length associated with the opposite polarizations are identical taking into consideration the difference in optical paths. In particular, realization of a small-scale mirror with such properties that are integrable with optical fibres can be challenging. Moreover, designing a bi-functional device with exactly same focal lengths (or precisely controlled difference between focal lengths) can be challenging due the requirement for a highly birefringent phase shaping metasurface.

In the special cases of designing some embodiments, a three-fold objective can be pursued (i) designing a highly reflective focusing mirror for only one polarization of light (with near unity focusing efficiency); (ii) transmitting the orthogonal polarization of light and focussing (with near unity focusing efficiency) at the same focal length, which can require designing a highly birefringent metasurface; (iii) the device may need to be compact and integratable with optical fibers.

Suitably high reflectivity contrast can be achieved by employing photonic crystal mirrors. Photonic crystals can potentially offer 100% reflectivity contrast for the orthogonal polarizations of light. The requirement for high focusing efficacy can be achieved by dielectric metasurfaces based on elliptical nanofins (nanorods) which, in principle, can provide 100% focusing efficiency and arbitrary phase from shaping for the orthogonal polarizations.

As can be understood, the examples described above and illustrated are intended to be exemplary only. Various alternate embodiments are possible. For instance, in one embodiment, the technology described above can form a device that would focus and then re-collimate light beam of one polarization, while acting as a Fabry-Perot resonator for a co-propagating light beam with the other polarization. The planar focusing lens can be designed using inverse phase mapping technique. The designed geometry can be implemented using a suitable etching recipe to fabricate high-aspect-ratio nanorods according to design specifications. An integrated cavity can provide high efficiency in smaller footprint, can be employed in free space, on-chip and with fiber. Embodiments can include all-optical switches and all-optical transistors; non-destructive photon detection; wavelength conversion of optical signals; quantum sensing and navigation; frequency standard and time keeping. The optical device can be produced in a standard nano-fabrication facility. The scope is indicated by the appended claims.

What is claimed is:

1. An optical device comprising:
   a substrate having a first face opposite a second face, a thickness between the first face and the second face, the first face and the second face being planar, the first face being parallel the second face, the substrate being transparent to an electromagnetic radiation in a given spectrum;
   a planar polarization-dichroic focusing lens covering the first face, the lens having a first focusing power for a first polarization of the electromagnetic radiation in the given spectrum and a second focusing power for a second polarization of the electromagnetic radiation in the given spectrum, the second focusing power being different from the first focusing power; and
   a planar polarization-dichroic mirror covering the second face, the mirror being reflective to the first polarization and transparent to the second polarization.

2. The optical device of claim 1 wherein the polarization dichroic mirror is a photonic crystal having a pattern of holes or a pattern of patterns of holes.

3. The optical device of claim 1 wherein the polarization-dichroic lens consists of a metasurface formed of an array of dielectric nanopillars.

4. The optical device of claim 1 wherein the first polarisation and second polarization are aligned along orthogonal axes both parallel to the first face and second face.

5. The optical device of claim 1 wherein optical device can act i) as a focussing mirror by receiving electromagnetic radiation of the first polarization via the polarization-dichroic focusing lens and ii) as a focussing lens by receiving electromagnetic radiation of the second polarization via the polarization-dichroic mirror, wherein a focal point of the focussing mirror is the same as the focal point of the focusing lens.

6. The optical device of claim 1 wherein a tip of an optical fiber is attached to the polarization-dichroic mirror.

7. A Fabry-Pérot cavity comprising a cavity and an optical device defining one side of the cavity, the optical device comprising:
   a substrate having a first face opposite a second face, a thickness between the first face and the second face, the first face and the second face being planar, the first face being parallel the second face, the substrate being transparent to an electromagnetic radiation in a given spectrum;
   a planar polarization-dichroic focusing lens covering the first face, the lens having a first focusing power for a first polarization of the electromagnetic radiation in the given spectrum and a second focusing power for a second polarization of the electromagnetic radiation in the given spectrum, the second focusing power being different from the first focusing power; and
   a planar polarization-dichroic mirror covering the second face, the mirror being reflective to the first polarization and transparent to the second polarization.

8. The Fabry-Pérot cavity of claim 7 wherein the optical device is a first optical device further comprising a second optical device forming a second side of the cavity, the second optical device comprising:

a substrate having a first face opposite a second face, a thickness between the first face and the second face, the first face and the second face being planar, the first face being parallel the second face, the substrate being transparent to an electromagnetic radiation in a given spectrum;

a planar polarization-dichroic focusing lens covering the first face, the lens having a first focusing power for a first polarization of the electromagnetic radiation in the given spectrum and a second focusing power for a second polarization of the electromagnetic radiation in the given spectrum, the second focusing power being different from the first focusing power; and a planar polarization-dichroic mirror covering the second face, the mirror being reflective to the first polarization and transparent to the second polarization.

9. The Fabry-Pérot cavity of claim 8 wherein the first optical device is mounted onto a tip of a first optical fiber, and the second optical device is mounted onto a tip of a second optical fiber, the first optical fiber and the second optical fiber being collinear.

10. The Fabry-Pérot cavity of claim 7 wherein the optical device is mounted onto a tip of an optical fiber.

* * * * *